United States Patent Office 3,525,729
Patented Aug. 25, 1970

3,525,729
PROCESS FOR PRODUCTION OF POLYMERS WITH CONTROLLED SATURATION
Rudolf H. Gaeth, Lake Jackson, Tex., assignor to Phillips Petroleum Company, a corporation of Delaware
No Drawing. Filed Dec. 4, 1967, Ser. No. 687,485
Int. Cl. C08d *3/06, 5/00*
U.S. Cl. 260—94.3
9 Claims

ABSTRACT OF THE DISCLOSURE

Polymers of conjugated 1,3-dienes with a controlled degree of saturation are prepared by (A) polymerizing the diene in the presence of a catalyst formed by mixing (1) a nickel component, (2) lithium aluminum hydride or organometallic compound and (3) boron trifluoride, a boron trifluoride complex with an ether, or hydrogen fluoride, and (B) then introducing hydrogen into the polymerization mixture without deactivating the catalyst under conditions such that a desired number of double bonds in the polymer are hydrogenated.

---

This invention relates to the production of polymers. In another aspect, the invention relates to the production of essentially linear polymers by catalytic polymerization followed by hydrogenation of the polymer in the presence of the polymerization catalyst. In still another aspect, the invention relates to controlling the unsaturation of diene polymers.

Polymers of conjugated dienes are highly unsaturated compositions, normally containing about one double bond for each monomer unit in the polymer chain. It is frequently advantageous to reduce this unsaturation in order to increase the stability of the polymer or alter its properties. One method of producing such polymers comprises contacting the monomer with a polymerization catalyst under conditions suitable for polymerization, deactivating the polymerization catalyst, and recovering the resulting polymer product. The polymer is then dissolved in a suitable solvent, a suitable hydrogenation catalyst is added to the reaction zone, hydrogen is added and hydrogenation is carried out to the desired extent.

It has now been discovered that the saturation of a polymer of a conjugated 1,3-diene can be controlled by polymerizing conjugated 1,3-diene monomers with a particular nickel catalyst and then, without recovering the polymer at the end of the polymerization step or introducing additional catalyst for the hydrogenation step, hydrogenating the polymer. By regulating the amount of hydrogen introduced, the time of reaction and the reaction conditions, any desired degree of saturation can be achieved. The nickel catalyst used is formed by mixing (1) a nickel component, (2) lithium aluminum hydride or organometallic compound and (3) boron trifluoride, a boron trifluoride complex with an ether, or hydrogen fluoride.

It is an object of my invention to provide a method of preparing polymers of conjugated dienes wherein the polymers have less than their original unsaturation.

Another object of my invention is to provide a method for producing essentially linear polymers comprising polymerization, then hydrogenation of the resulting polymer using the same polymerization catalyst.

Still another object of my invention is to provide a method to control the degree of saturation of a diene polymer.

Other objects, advantages and features of my invention will be apparent to those skilled in the art from the following disclosure.

The polymers which are prepared according to this invention are homopolymers or copolymers of conjugated 1,3-dienes containing from 4 to 12 carbon atoms. Conjugated 1,3-dienes containing from 4 to 8 carbon atoms are preferred. Examples of conjugated 1,3-dienes which can be advantageously utilized are butadiene, isoprene, chloroprene, 2,3-dimethyl-1,3-butadiene, 2 - methyl - 1,3-pentadiene, 2,3-dimethyl-1,3-pentadiene, 2-methyl-3-ethyl-1,3-pentadiene, 1 - cyanobutadiene, 2-methoxybutadiene, 2,3-di-n-propyl-1,3-butadiene, and the like. 1,3-butadiene is the preferred monomer.

The polymerization catalyst used in the process of this invention forms on mixing materials comprising (1) a nickel component, (2) lithium aluminum hydride or an organometallic compound and (3) boron trifluoride, boron trifluoride etherate, or hydrogen fluoride.

The organometallic compounds and lithium aluminum hydrides that can be used in the process of my invention are compounds having the formula $R_mAlCl_n$, $$LiAlH_xR_{(4-x)}$$

or $R_yM$ wherein R is a saturated aliphatic, saturated cycloaliphatic or aromatic radical or combinations thereof containing from 1 to 20 carbon atoms, $m$ and $n$ are integers or 1 or 2 such that $m+n=3$, $x$ is an integer of from 0 to 4, M is lithium, sodium, potassium, rubidium, cesium, beryllium, magnesium, zinc, cadmium, aluminum, gallium, or indium, and $y$ is an integer equal to the valence of the metal. Mixtures of the foregoing organometallic compounds can be used. Preferred organometallic compounds include trialkylaluminum compounds and lithium aluminum tetraalkyl compounds.

Examples of suitable organometallic compounds include trimethylaluminum, triisobutylaluminum, tri-n-eicosylaluminum, triphenylaluminum, methylaluminum sesquichloride, diethylaluminum chloride, lithium aluminum dimethyl dihydride, lithium aluminum butyl trihydride, lithium aluminum tri-n-decyl hydride, lithium aluminum n-eicosyl trihydride, lithium aluminum tetraethyl, lithium aluminum tetrabutyl, n-butyllithium, 4-tolylaluminum dichloride, diphenylaluminum chloride, 2-naphthyllithium, diethylmagnesium, diphenylmagnesium, trimethylgallium, diethylphenylgallium, tribenzylgallium, 4 - methylcyclohexyl potassium, benzyllithium, n-eicosyllithium, phenyl sodium, cyclohexylpotassium, isobutylrubidium, n-nonylcesium, diethylberyllium, diphenylberyllium, diethylzinc, dicyclopentylzinc, di-n-propylcadmium, dibenzylcadmium, trimethylindium, triphenylindium, and the like.

The nickel component used in this invention can be metallic nickel having a large surface area for its weight or a reducible nickel compound. When metallic nickel is used, it should be in the form of a colloid, fine powder or porous solid such as reduced nickel adhered to carriers or Raney type nickel. The nickel compounds used in this invention are those nickel compounds that are capable of being reduced by the above-described organometallic compounds. In the desired reduction reaction, the nickel is reduced to a lower valence state. The desired reduction is accomplished by contacting the nickel compound with the above-described organometallic compound or lithium aluminum hydride. Suitable reducible nickel compounds include nickel oxide, nickel salts of inorganic acids and organic acids, nickel salts of beta-diketones of the formula:

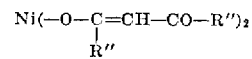

wherein R" is a saturated aliphatic, saturated cycloaliphatic or aromatic radical or combination thereof, containing from 1 to 10 carbon atoms, and complex compounds such as dicyclopentadienylnickel, and the nickel complex with the ethyl ester of acetoacetic acid. Examples of suitable nickel salts include the nickel salts of hydrochloric acid, hydrobromic acid, hydroiodic acid, sulfuric acid, nitric acid, phosphoric acid, caprylic acid, capric acid, lauric acid, myristic acid, palmitic acid, stearic acid, arachidic acid, cyclobutanecarboxylic acid, cyclohexanecarboxylic acid, benzoic acid, and 2-naphthoic acid. Examples of suitable nickel salts of the beta-diketones include the nickel salts of 2,4-pentanedione (acetylacetone), 3,5-heptanedione, 1,5-dicyclopentyl-2,4-pentanedione, and the like. Mixtures of the foregoing nickel components can be used. Nickel salts of organic carboxylic acids are preferred.

In general, nickel compounds that are reduced with the lithium aluminum hydride or the organometallic compounds are preferred in the process of my invention.

It is within the scope of my invention to utilize nickel components that are supported on various carriers such as diatomaceous earth, silica-alumina, silica, alumina, titania, zirconia, kaolin, ion-exchange resins, and the like. The metallic nickel or the reducible nickel compound, such as nickel oxides and the like, can be supported on the above-mentioned carriers.

The third component of the polymerization catalyst utilized in this invention is selected from the group consisting of boron trifluoride, boron trifluoride complexed with an ether having from 1 to 20 carbon atoms per molecule, and hydrogen fluoride.

In preparing the catalyst compositions, the components can be combined in any order, but it is preferred to avoid adding the nickel component last. For example, the nickel compound and the lithium aluminum hydride or organometallic compound can be first mixed in the presence of a hydrocarbon diluent such as a diluent suitable for polymerization. The polymerization diluent generally contains up to and including 20 carbon atoms per molecule. Examples of such diluents include cyclohexane, n-hexane, benzene, toluene, and the like. The mixture is maintained at a temperature within the range of 0 to 75° C. for sufficient time to allow the materials to react. The reaction time is dependent upon the temperature and will generally be in the range of one minute to fifty hours. If desired, this reaction can be conducted in the presence of a portion of the monomer to be used in the polymerization. The third component, i.e., the boron fluoride or hydrogen fluoride, can then be charged to the polymerization as a separate ingredient. Alternatively, it is sometimes desirable to combine the nickel component and the fluoride, and then add the organometal or hydride.

The mole ratio of nickel compound to lithium aluminum hydride or organometallic compound is in the range of 0.05:1 to 1:1 preferably 0.1:1 to 0.5:1. The mole ratio of hydrogen fluoride or boron compound to lithium aluminum hydride or organometallic compound is in the range of 0.5:1 to 10:1, preferably 1:1 to 4:1. The catalyst level, based on the nickel component, is generally in the range of 0.02 to 4 gram millimoles, or milligram atoms in the case of metallic nickel, per 100 grams monomer charged to the polymerization, preferably in the range of 0.04 to 0.5 gram millimoles, or milligram atoms in the case of metallic nickel, per 100 grams monomer.

The polymerization temperature can be any conventional temperature and is generally in the range of 0° F. to 250° F., preferably in the range of 50° F. to 200° F.

After the desired amount of polymer has formed, generally after at least 60 percent conversion of the monomer, hydrogen is introduced into the reaction mixture. Conditions for the hydrogenation reaction include temperatures in the range of about 50 to about 500° F. and gauge pressures up to about 1000 pounds per square inch. Preferred conditions are temperatures of 170 to 400° F. and pressures of 10 to 500 pounds per square inch gauge. The reaction time can vary from one minute to twenty-five hours or more, preferably fifteen minutes to ten hours, depending upon the extent of hydrogenation desired. Pressure in the reactor for both polymerization and hydrogenation steps is usually that which is sufficient to maintain the reaction mixture substantially in the liquid phase.

By regulating the amount of hydrogen introduced into the polymer, partially hydrogenated polymers or polymers that are essentially completely saturated can be produced.

The polymer can be recovered by any well known technique such as coagulation, removal of the diluent by evaporation, or the like. Catalyst residues can be separated from the polymer by well known methods.

By hydrogenation of the polymer in the polymerization mixture, a great saving in time and equipment can be realized. The same catalyst serves two functions and, therefore, only one reaction zone is needed as well as only one recovery system.

The advantages of this invention are further illustrated by the following example. The reactants and their proportions and other specific conditions are presented as being typical and should not be construed to limit the invention unduly.

The essentially linear polymers produced by the process of this invention wuold have different uses depending on the extent of saturation. At a low degree of saturation, they are rubbery polymers that can be used in the manufacture of tires, gaskets, and the like. The polymers having a high degree of saturation can be used in the manufacture of molded plastic articles such as bowls, pipes, containers, and the like.

EXAMPLE

Butadiene was polymerized in the presence of a catalyst system made by mixing nickel naphthenate, triethylaluminum, and boron trifluoride etherate to produce high cis-polybutadiene. Hydrogen was then introduced into the reaction mixture containing active catalyst to effect hydrogenation of the double bonds in the polymer. The polymerization recipe and polymerization conditions were as follows:

| | |
|---|---|
| 1,3-butadiene, parts by weight | 100 |
| Cyclohexane, parts by weight | 800 |
| Nickel naphthenate, mhm. | 0.4 |
| Triethylaluminum, mhm. | 1.6 |
| Boron trifluoride etherate [1] | 3.2 |
| Temperature, ° F. | 158 |
| Time, hours | 3 |
| Conversion, percent | 72 | mhm.=Gram millimoles per 100 grams monomer.
[1] = BF$_3$-ethyl ether complex.

When conducting the polymerization, cyclohexane was charged first after which the reactor was purged with nitrogen. Butadiene was added followed by a mixture, previously prepared, of the nickel naphthenate and triethylaluminum. The temperature was adjusted to 158° F. and boron trifluoride etherate was added. After polymerization had been allowed to proceed for three hours, a sample of the reaction mixture was withdrawn and shortstopped with a 10 weight percent solution of 2,2'-methylene-bis(4-methyl-6-tert-butylphenol) in a mixture of equal parts by weight of isopropyl alcohol and toluene, the amount added being sufficient to provide about 1 part of the antioxidant per 100 parts of polymer. The polymer was coagulated in isopropyl alcohol, separated, and dried. Inherent viscosity, gel, unsaturation, and microstructure were determined.

The reactor containing the remainder of the polymerization mixture with the active polymerization catalyst was pressured to 500 p.s.i.g. with hydrogen and the temperature was increased to 212° F. After two hours a sample of the hydrogenated polymer was withdrawn, recovered as described above, and physical properties determined. Hydrogenation of the remainder of the polymerization mixture was continued for 2.5 more hours, or a total hydrogenation time of 4.5 hours. Another sample was withdrawn, recovered, and physical properties determined. Physical properties of the three polymer samples were as follows:

|  | Original polymer | After 2 hours hydrogenation | After 4.5 hours hydrogenation |
|---|---|---|---|
| Inherent viscosity [b] | 2.25 | 2.17 | 2.15 |
| Unsaturation, percent [a] | 95.3 | 87.7 | 80.1 |
| Microstructure, percent: [c] | | | |
| Cis | 95.6 | 89.1 | 83.2 |
| Trans | 2.4 | 9.2 | 15.4 |
| Vinyl | 2.0 | 1.7 | 1.4 |

[a] Inherent viscosity was determined by the method outlined in U.S. Pat. No. 3,278,508, column 20, note a.
[b] Unsaturation percent was determined by the method outlined in U.S. Pat. No. 3,299,016, column 9, lines 57 ff.
[c] Microstructure was determined by the method outlined in U.S. Pat. No. 3,278,508, column 20, lines 71 ff, and column 21, lines 1–21.

These data show that the two process steps, polymerization followed by hydrogenation, can be conducted in the same reactor in the presence of the catalyst charged initially and that the hydrogenation step can be controlled to give a product having a desired amount of unsaturation.

What is claimed is:

1. A method for producing diene polymers which are at least partially saturated comprising contacting a conjugated 1,3-diene with a polymerization catalyst formed by mixing a nickel component selected from metallic nickel having a large surface area for its weight or a reducible nickel compound; a lithiumaluminum hydride or organometallic compound selected from compounds having the formula $R_mAlCl_n$, $LiAlH_xR_{(4-x)}$ or $R_yM$ wherein R is a saturated aliphatic, saturated cycloaliphatic or aromatic radical or combinations thereof containing from 1 to 20 carbon atoms, $m$ and $n$ are integers of 1 or 2 such that $m+n$ equals 3, $x$ is an integer of from 0 to 4, M is lithium, sodium, potassuim, rubidium, cesium, beryllium, magnesium, zinc, cadmium, aluminum, gallium, or indium, and $y$ is the integer equal to the valence of the metal; and boron trifluoride, boron trifluoride etherate, or hydrogen fluoride to produce a polymer and thereafter without the addition of further catalyst introducing hydrogen to the polymerization mixture containing the active polymerization catalyst and thus at least partially hydrogenating said polymer using only said polymerization catalyst under hydrogenation conditions.

2. The method of claim 1 wherein the hydrogenation temperature is in the range of 50 to 500° F.

3. The method of claim 2 wherein the hydrogenation pressure is in the range of from 0 to 1000 pounds per square inch gauge.

4. The method of claim 3 wherein the hydrogenation reaction time is from 1 minute to twenty-five hours.

5. The method of claim 4 wherein the mole ratio of said nickel component to said lithium aluminum hydride or said organometallic compound is in the range of .05:1 to 1:1, the ratio of said lithium aluminum hydride or said organometallic component to said hydrogen fluoride, boron trifluoride, or boron trifluoride etherate, is in the range of .1:1 to 2:1; and wherein the amount of catalyst is in the range of 0.02 to 4 gram millimoles of the nickel component, or milligram atoms in the case of metallic nickel, per 100 grams of monomer.

6. The method of claim 5 wherein the polymerization temperature is in the range of 0° F. to 250° F.

7. The method of claim 6 wherein the said conjugated 1,3-diene is 1,3-butadiene.

8. The method of claim 7 wherein said polymerization catalyst is formed from a nickel salt of an organic carboxylic acid, trialkylaluminum, and boron trifluoride etherate.

9. The method of claim 7 wherein the said polymerization catalyst is formed from nickel naphthenate, triethylaluminum, and boron trifluoride etherate.

References Cited

UNITED STATES PATENTS

| 3,331,824 | 7/1967 | Folzenlogen et al. | 260—88.2 |
| 3,170,904 | 2/1965 | Ueda et al. | 260—94.3 |
| 3,170,905 | 2/1965 | Ueda et al. | 260—94.3 |
| 3,170,907 | 2/1965 | Ueda et al. | 260—94.3 |
| 3,138,579 | 6/1964 | Cabaness | 260—94.9 |

FOREIGN PATENTS

| 1,030,306 | 5/1966 | Great Britain. |
| 1,419,658 | 10/1965 | France. |

JOSEPH L. SCHOFER, Primary Examiner

R. A. GAITHER, Assistant Examiner

U.S. Cl. X.R.

260—82.1, 87.5, 91.1, 92.3, 94.7, 96